United States Patent [19]

Hashimoto et al.

[11] Patent Number: 4,951,642
[45] Date of Patent: Aug. 28, 1990

[54] COMBUSTION CHAMBER OF INTERNAL COMBUSTION ENGINE

[75] Inventors: Noboru Hashimoto; Yasuhiro Yuzuriha; Katsumi Okazaki; Tsugio Fukube, all of Hiroshima, Japan

[73] Assignee: Mazda Motor Corporation, Hiroshima, Japan

[21] Appl. No.: 438,257

[22] Filed: Nov. 20, 1989

[30] Foreign Application Priority Data

Nov. 19, 1988 [JP] Japan ............................. 63-292809
Nov. 29, 1988 [JP] Japan ............................. 63-303306
Nov. 30, 1988 [JP] Japan ............................. 63-304611

[51] Int. Cl.$^5$ .................................... F02B 23/00
[52] U.S. Cl. .................... 123/657; 123/193 H; 123/661
[58] Field of Search ............... 123/657, 659, 661, 667, 123/193 H

[56] References Cited

U.S. PATENT DOCUMENTS

3,144,008 8/1964 List ........................................ 123/661
3,766,900 10/1973 Aiti ................................... 123/193 H
4,259,933 4/1981 Nakanishi et al. ................... 123/661
4,543,931 10/1985 Hitomi et al. ....................... 123/661

Primary Examiner—Andrew M. Dolinar
Assistant Examiner—M. Macy
Attorney, Agent, or Firm—Fleit, Jacobson, Cohn, Price, Holman & Stern

[57] ABSTRACT

A combustion chamber structure including a cylinder head having a bottom surface for defining an upper portion of a combustion chamber, a piston having a top surface for defining a lower portion of the combustion chamber, an intake recess formed in the cylinder head for an intake port of the combustion chamber to define a part the chamber, an exhaust recess formed in the cylinder head for an exhaust port to define a part of the chamber. The intake recess is smaller than the exhaust recess in volume. An extended wall portion is formed at a boundary portion between the intake and exhaust recess in the cylinder head to extend along the intake port and project into the exhaust recess. An ignition plug is arranged in the vicinity of a tip end of the extended wall portion. A compact structure of the combustion chamber can be obtained with an improved combustion property.

11 Claims, 7 Drawing Sheets

COMBUSTION CHAMBER OF INTERNAL COMBUSTION ENGINE

BACKGROUND OF THE INVENTION

1. Field of the invention

This invention relates to a combustion chamber of an internal combustion engine, specifically to a compact structure of the combustion chamber.

2. Description of the prior art

In recent years, there has been proposed a compact structure of a combustion chamber in which a recess is formed on a lower portion of a cylinder head which defines an upper portion of the combustion chamber and/or on an upper surface or crown portion of a piston which defines a bottom portion of the combustion chamber so as to obtain a necessary volume without increasing a dimension of an entire structure. Such compact structure of the combustion chamber is advantageous in that a combustion rate of a combustible mixture in the chamber can be improved since a spark generated by an ignition plug can be quickly propagated in the whole chamber.

Japanese Patent Public Disclosure No. 57-198315, laid open to the public on Dec. 4, 1982, discloses a combustion chamber having a recess formed in a cylinder head wherein the recess is provided with a wall portion surrounding an intake and exhaust ports of the chamber to define an intake sub-chamber and an exhaust sub-chamber.

In this combustion chamber disclosed in the Japanese patent publication, an ignition plug is arranged in a recess provided in a boundary portion between the intake and exhaust sub-chambers of the cylinder head.

U.S. Pat. No. 3,766,900, German Patent No. 1,801,765 and English Patent No. 640,734 disclose compact structures of the combustion chamber.

With the above structure of combustion chamber as disclosed in the Japanese patent publication, it should however be noted that a combustible mixture cannot be supplied sufficiently around the ignition plug during a compression stage causing a deterioration of a flame propagation. In addition, an exhaust gas tends to stay around the ignition plug during an intake stage and a hydrocarbon compound may deposit on the plug because of a poor scavenging effect so that a combustion property may be eventually deteriorated.

SUMMARY OF THE INVENTION

It is therefore a primary object of the present invention to provide a compact structure of a combustion chamber of an internal combustion engine in which an improved combustion property of the engine can be obtained.

It is another object of the present invention to provide a combustion chamber in which a combustible mixture is effectively supplied for an ignition plug.

It is still another object of the present invention to provide a combustion chamber in which an exhaust gas is effectively scavenged around the ignition plug.

According to the present invention, the above and the other objects of the invention can be accomplished by a combustion chamber structure for an internal combustion engine comprising a cylinder head for defining an upper portion of a combustion chamber, a piston for defining a lower portion of the combustion chamber, an intake recess formed in the cylinder head for an intake port of the combustion chamber to define a part of the upper portion of the combustion chamber, an exhaust recess formed in the cylinder head for an exhaust port to define a part of the upper portion of the combustion chamber, said intake recess being smaller than said exhaust recess in volume or diameter, an extended wall portion formed at a boundary portion between the intake and exhaust recess in the cylinder head to extend along the intake port and project into the exhaust recess, and an ignition plug arranged in the vicinity of a tip end of the extended wall portion.

According to the preferred embodiment of the present invention, the combustion chamber structure is further provided with a swirl forming structure for introducing an intake gas along the extended wall portion in a substantially tangential direction of the combustion chamber. The intake and exhaust recesses have semi-circular contour lines and semi-spherical configurations.

The exhaust recess is greater than the intake recess in volume or diameter so that an improved flame propagation and thus good combustion property can be obtained. This is because the exhaust recess is higher than the intake recess in temperature.

The ignition plug is arranged adjacent to the tip end of the extended wall portion so that a combustible mixture can be effectively introduced toward the ignition plug and the exhaust gas is promptly scavenged around the ignition plug. This is because the extended wall effects to expose the ignition plug into a stream of the combustible mixture or the exhaust gas. This effect can be facilitated by providing the swirl forming structure.

The above and other objects and features of the present invention will become apparent from the following description in connection with the preferred embodiment taking reference with the accompanying drawings.

DESCRIPTION OF THE PREFERRED EMBODIMENTS

Figure 1:
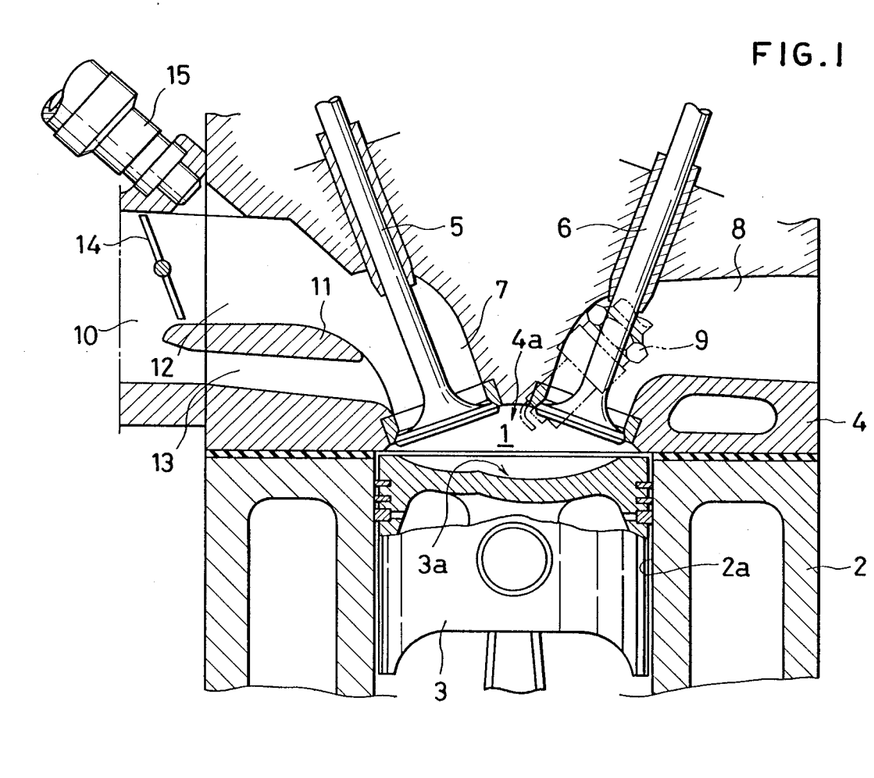
FIG. 1 is a sectional view showing an upper portion of a cylinder of an engine to which the present invention can be applied.

Referring to the drawings, specifically to FIG. 1, an engine is provided with a cylinder block 2, a piston 3 disposed in a bore 2a formed in the cylinder block 2 and a cylinder head 4 mounted on the cylinder block 2. A combustion chamber 1 is defined by a top surface of the piston 3 including a recess 3a formed on the top surface and a bottom surface of the cylinder head 4 including a recess 4a formed on the bottom surface.

The cylinder head 4 is formed with an intake port 7 and an exhaust port 8 by which an intake and exhaust systems are communicated with the chamber 1 through an intake valve 6 and an exhaust valve respectively. An ignition plug 9 is mounted on the cylinder head 4 so as to project into the chamber 1.

The illustrated engine is provided with a high load passage 12 and a low load passage 13 biforked from an intake passage 10. The high load passage 12 is greater than the low load passage 13 in cross sectioned area. A gate valve 14 is disposed at an upstream end portion of the high load passage 12. A fuel injection valve 15 is disposed oriented to the chamber 1 downstream of the gate valve 14.

Figure 2:
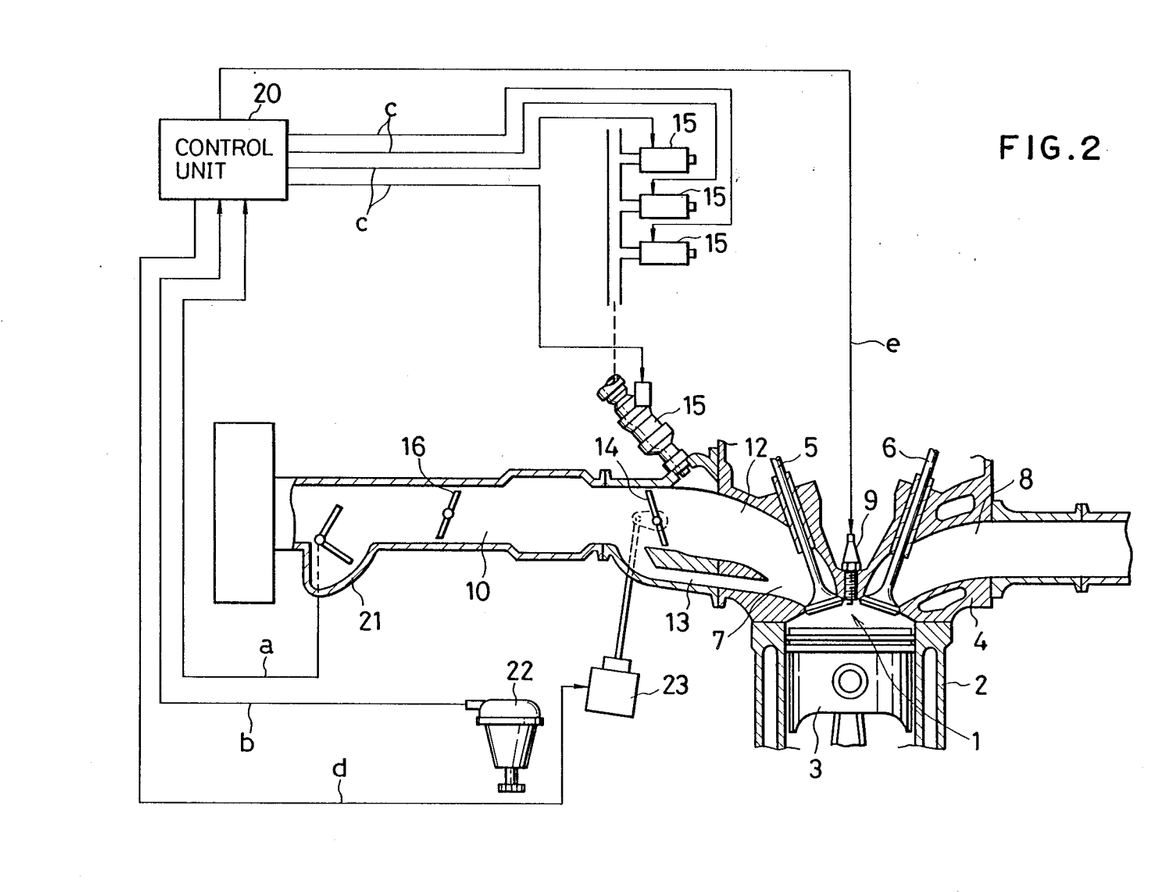
FIG. 2 is a view showing a control system for the engine in FIG. 1.

Referring to FIG. 2, there is shown a control system for the illustrated engine. The control system is provided with a control unit 20 which receives a signal denoting an intake air flow rate a from an air flow meter 21 and a signal b denoting an engine speed signal from a distributor 22 associating with a crank shaft.

The control unit 20 calculates an amount of intake air introduced into each of cylinders of the engine based on the amount of the intake air Q by the signal a and the engine speed N by the signal b. Thereafter the control unit 20 determines an amount of fuel injection corresponding to the amount of the intake air for the cylinder and provides each of the fuel injection valves 15 with a fuel control signal c to accomplish the amount of the fuel injection. In addition, the control unit 20 calculates an engine load P based on the amount of the intake air Q and the engine speed N and provides an actuator 23 of the gate valve 14 with a control signal d to control the gate valve 14 and provides the ignition plug 9 with an ignition control signal e to optimize an ignition timing in accordance with an engine operating condition defined by the engine load P, engine speed N and the like.

Figure 3:
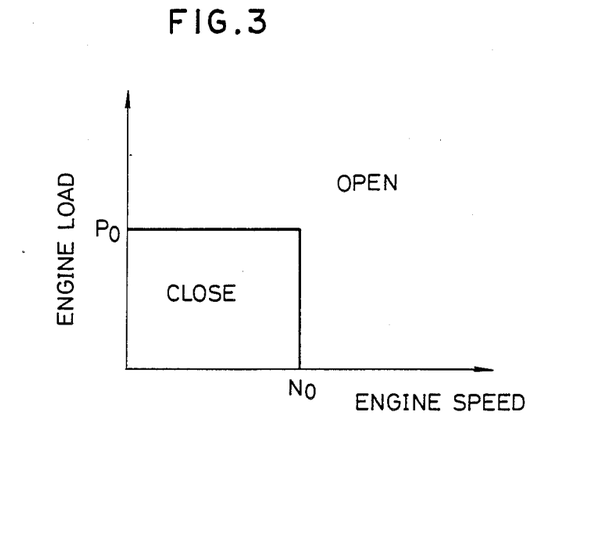
FIG. 3 is a graphical representation showing an operation of a gate valve employed in the engine of FIG. 1 in relation with an engine load and engine speed.

In the illustrated embodiment, the gate valve 14 is controlled to be closed when the engine load P is lower than a predetermined value PO (such as −150 mmHg as an intake pressure) and the engine speed N is lower than a predetermined value NO (such as 3000 rpm) as shown in FIG. 3.

Figure 4:
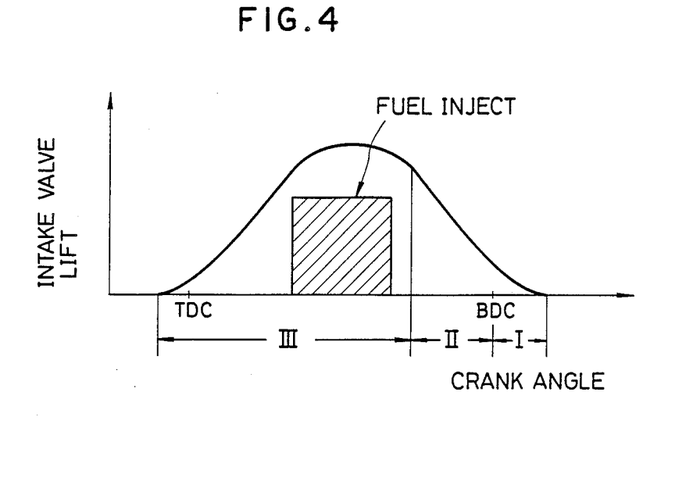
FIG. 4 is a time chart showing a relationship between an intake valve opening timing and a fuel injection timing.

In intake stage of the engine, a part of the intake gas introduced into the combustion chamber 1 is pushed out of the chamber 1 as the piston 3 passes B.D.C. until the intake valve 5 is closed during a period I as shown in FIG. 4. The part of the intake gas is considered to be introduced into the chamber 1 during a period II. In view of this, a fuel injection period is set within a period III as shown by hatching in FIG. 4. The time period III can be defined to be from an opening of the intake valve 5 to a starting point of the period II. Where the fuel injection is carried out middle or late in the period III, a high fuel concentration in the intake gas can be produced in an upper portion of the chamber 1 or the bore 2a. There is provided a throttle valve 16 in the intake passage 10.

Referring to FIGS. 5-8, there is shown a bottom surface of the cylinder head 4 which defines a ceiling of the chamber 1 corresponding to a circular configuration of the bore 2a. There is provided a squish area 4b at a peripheral portion of the surface. The squish area 4b is provided to be relatively broad around the intake recess portion 1a compared with the exhaust recess portion 1b.

A recess 4a is formed in a middle portion of the surface of the cylinder head 4 for defining an upper portion of the combustion chamber 1. An intake recess portion 1a is provided within the recess 4a including the intake port 7 which is opened at one side of the recess 4a while an exhaust recess portion 1b is provided within the recess 4a including the exhaust port 8 which is opened at the other side of the recess 4a. A contour line of the recess 4a extends along substantially the intake port 7 in the vicinity thereof so as to surround the intake port 7. It should be noted that the contour line of the recess 4a is spaced from the exhaust port 8 specifically in an upper portion thereof in FIG. 5. This means that the exhaust recess portion 1b is greater than the intake recess portion 1a in volume or diameter. The intake and exhaust recess portions 1a and 1b are of basically semispherical configuration in three dimensional observation and semi-circular configuration in two dimensional observation.

Figure 5:
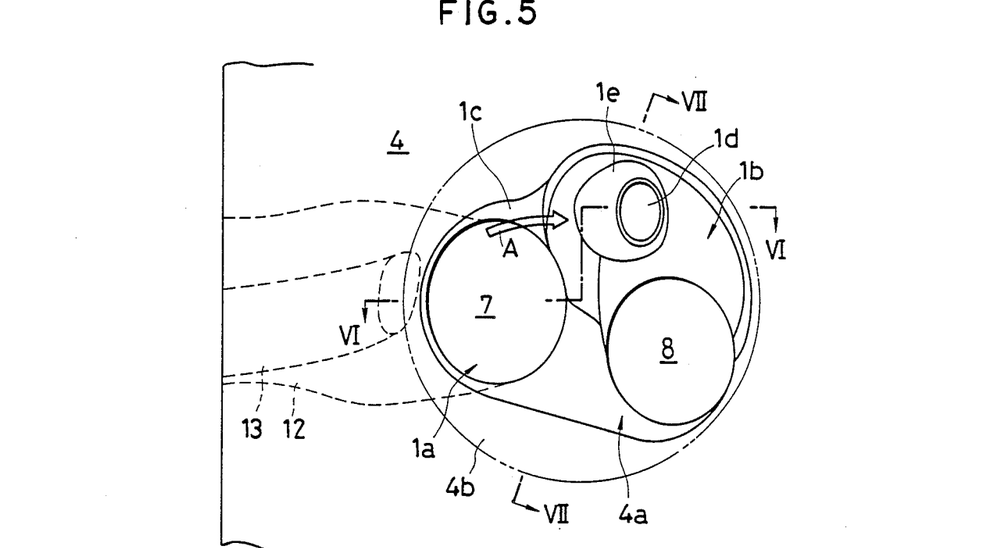
FIG. 5 is a plan view showing a bottom surface of a cylinder head.
Figure 6:
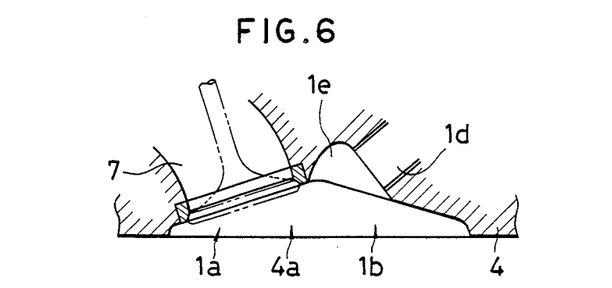
FIG. 6 is a sectional view taken along a line VI—VI in FIG. 5.
Figure 7:
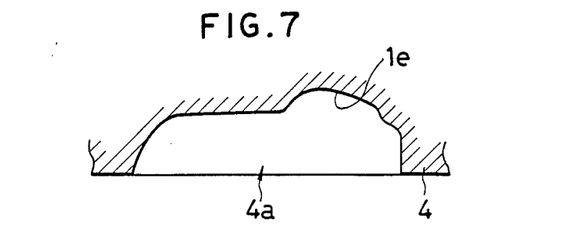
FIG. 7 is a sectional view taken along a line VII—VII in FIG. 5.
Figure 8:
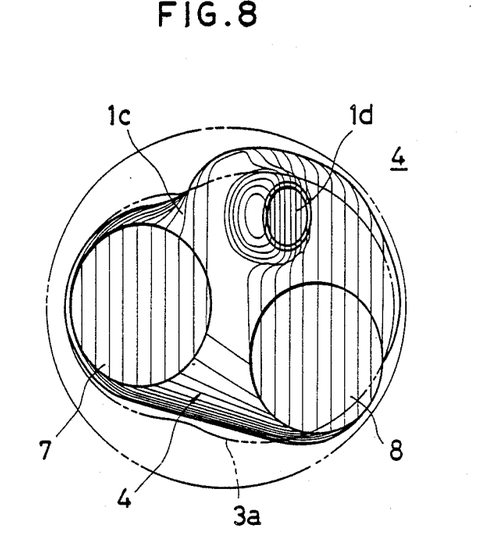
FIG. 8 is a contour map showing a ceiling of the combustion chamber.
Figure 11:
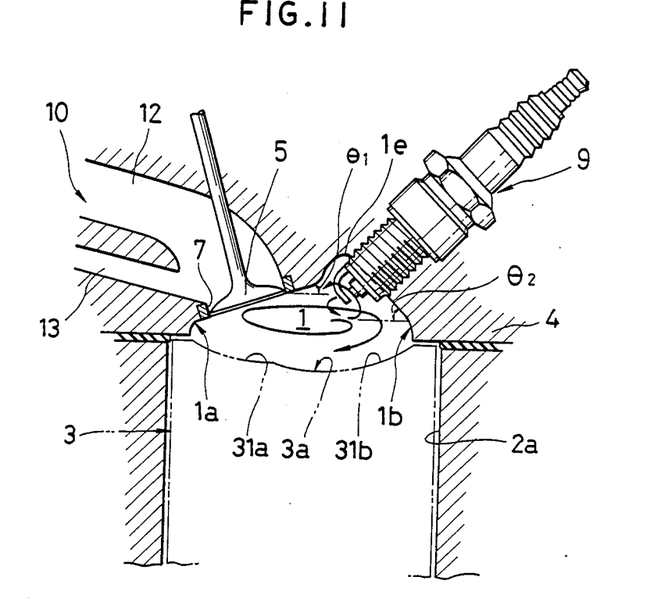
FIG. 11 is a sectional view of an upper portion of the engine of FIG. 1.

The contour line of the recess 4a is smoothly continued from the intake recess portion 1a to the exhaust recess portion 1b at a lower side thereof in FIG. 5 while curved at an upper side thereof. This is because an extended wall portion 1c is formed to project into the recess 4a at a boundary portion between the intake recess portion 1a and the exhaust recess portion 1b. The extended wall portion 1c extends along substantially the intake port 7 to surround it so that the intake gas through the low load passage 13 to the chamber 1 is introduced in a tangential direction of the chamber 1 along a surface of the extended wall portion 1c as shown by an arrow in FIG. 5. There is provided an opening 1d for mounting the ignition plug 9 in the vicinity of a tip end of the extended wall portion 1c. Preferably, the ignition plug 9 is positioned adjacent to or in front of the tip end of the extended wall portion 1c within the exhaust recess portion 1b. More specifically, the ignition plug 9 is arranged substantially on a line extended along the surface of the extended wall portion 1c facing to the intake port 7. A further recess portion 1e is formed around the opening 1d in the exhaust recess portion 1b as shown in FIG. 6 so that a certain amount of the combustible mixture of the fuel can stay around the ignition plug 9. As shown in FIG. 11, the surface of the recess 4a is inclined at an angle $\theta 1$ to a reference line in the vicinity of the intake port 7 or at an upstream position with regard to the stream line of the swirl of the intake gas. Whereas, the surface of the recess 4a is inclined at an angle $\theta 2$ ($\theta 1 < \theta 2$) to the reference line in the vicinity of the exhaust port 8 or at an downstream position. As a result, a rich combustible mixture of the intake gas can be effectively reflected toward the ignition plug 9. The FIG. 8 shows a contour map of the bottom surface of the cylinder head 4 except the intake and exhaust ports 7, 8 and the opening 1d.

Figure 9:
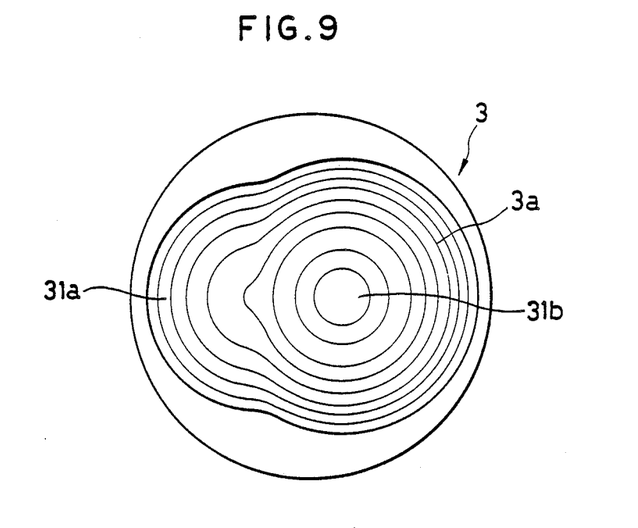
FIG. 9 is a contour map showing a bottom surface of the combustion chamber.
Figure 10:
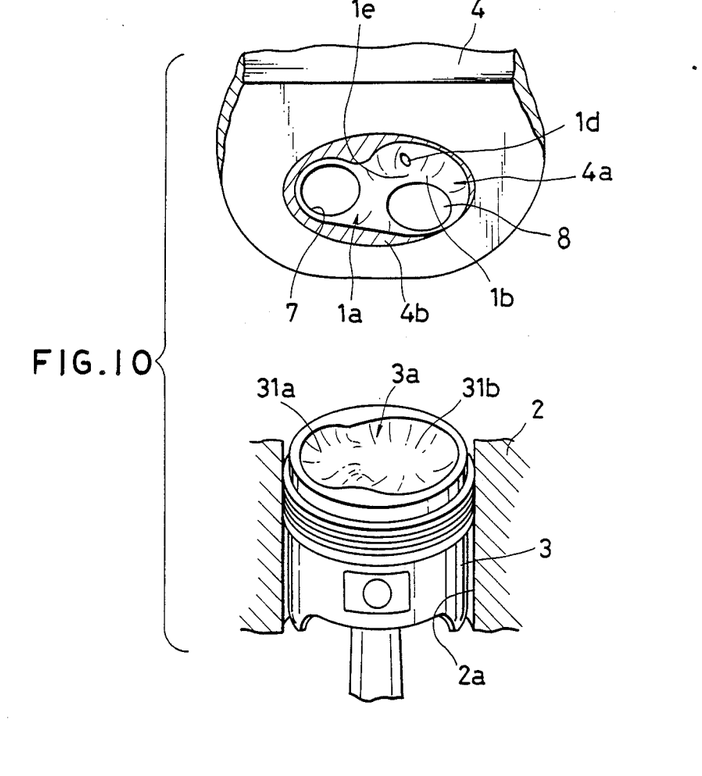
FIG. 10 is a developed perspective view showing both the ceiling and the bottom surface of the combustion chamber.

FIG. 9 shows a top surface of the piston 3 and thus shows a contour and configuration of the recess 3a by means of a contour map. The recess 3a is of a configuration having a first and second recess portions 31a and 31b with substantially semi-spherical surfaces corresponding to the intake and exhaust recess portions 1a, 1b respectively as shown FIG. 9 and FIG. 10. The first and second recess portions 31a and 31b are of semi-circular configurations in two dimensional configuration and being arranged in a crossing relationship to each other to form a projection for producing a stream disturbance within the swirl at a downstream position.

Figure 12:
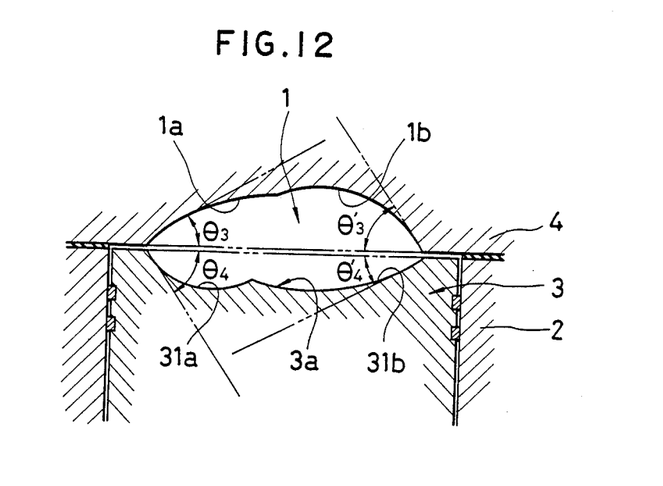
FIG. 12 is a sectional view of an upper portion of the engine of FIG. 1.

The second recess portion 31b is greater than the first recess portion 31a in diameter or in volume. As shown in FIG. 12, an angle $\theta3$ of a tangential line at an edge of the recess 4a of the cylinder head 4 against the reference line is substantially complementary with an angle $\theta4$ of a tangential line at an edge of the recess 3a of the top surface of the piston 3 against the reference line wherein the edges of the recesses 4a and 3a are continued to the squish area 4b. In other words, the recesses 3a and 4a are constituted in a manner that the angle $\theta4$ is decreased to take a smaller value $\theta4'$ as the angle $\theta3$ is increased toward a downstream side to take a larger value $\theta3'$. Thus, the configurations of the recesses 3a and 4a are so designed that the sum of the angle $\theta3$ and angle $\theta4$ are kept as constant as possible.

In operation, the intake gas is introduced into the chamber 1 through the low load passage 13 during an engine operating condition of a low engine load and low engine speed because the gate valve 14 is closed. The low load passage 13 is of a relatively small area in cross section so that the intake gas passes through the low load passage 13 with a relatively high velocity. In addition, the low load passage 13 is arcuate to be oriented substantially tangentially to the chamber 1. As a result, the intake gas being introduced into the chamber 1 produces a swirl along the extended wall portion 1c. Since the ignition plug is arranged in the vicinity of the tip end of the extended wall portion 1c, the ignition plug 9 is exposed to a stream of the swirled intake gas so that a desirable introduction of the intake gas and scavenging effect of the exhaust gas can be accomplished by preventing a hydrocarbon compound from building up on the ignition plug 9 and preventing the exhaust gas from staying around the ignition plug 9.

As aforementioned in connection with FIG. 4, the fuel injection is carried out middle or late in the period III so that a high concentration layer of the fuel can be formed in an upper portion of the chamber where the ignition plug is located. In addition, when the swirl is produced, the fuel component in the intake gas is moved toward the surface of the extended wall portion 1c to increase the fuel concentration of the stream in the vicinity of the surface of the extended wall portion 1c due to a centrifugal force in the swirl. This fuel concentrated intake gas is introduced toward the ignition plug 9 by virtue of an orientation of the extended wall portion 1c. Thus, the combustion property can be improved. The exhaust recess portion 1b of the greater volume or diameter is kept at a higher temperature relative to the intake recess portion 1a. This facilitates a quick flame propagation and a combustion of the intake gas in the chamber 1.

The boundary portion opposite to the extended wall portion 1c is smoothly continued from the intake recess portion 1a to exhaust recess portion 1b so that the swirl produced is not weakened as the gas stream passes through the boundary portion late in a compression stage and early in an inflation stage. At this stage, a squish stream of the gas in the chamber 1 is produced in the squish area 4b and the squish stream is effected to facilitate the flame propagation by producing a stream disturbance in the intake recess portion 1a. In this case, the squish stream is maximized at approximately 20 degrees in crank angle before TDC so that an ignition timing is set at approximately 15-20 degrees before TDC.

While the invention has been specifically described in connection with preferred embodiments thereof, it will be understood by those skilled in the art that the foregoing and other changes or modifications in form and details can be made therein without departing from the spirit and scope of the invention.

We claim:

1. A combustion chamber structure for an internal combustion engine comprising a cylinder head having a bottom surface for defining an upper portion of a combustion chamber, a piston disposed in a bore of a cylinder block for reciprocating movement and having a top surface for defining a lower portion of the combustion chamber, an intake recess formed in the cylinder head for an intake port of the combustion chamber to define a part of the upper portion of the combustion chamber, an exhaust recess formed in the cylinder head for an exhaust port to define a part of the upper portion of the combustion chamber, said intake recess being smaller than said exhaust recess in diameter, an extended wall portion formed at a boundary portion between the intake and exhaust recess in the cylinder head to extend along the intake port and project into the exhaust recess, and an ignition plug arranged in the vicinity of a tip end of the extended wall portion.

2. A combustion chamber structure as recited in claim 1 further comprising swirl forming means for introducing an intake gas along the extended wall portion in a substantially tangential direction of the combustion chamber.

3. A combustion chamber structure as recited in claim 1 wherein the intake and exhaust recesses have semi-circular contour lines.

4. A combustion chamber structure as recited in claim 3 further comprising a squish area provided on the bottom surface, the squish area being located on outer sides of the intake and exhaust recesses and corresponding to a peripheral portion of the bore of the cylinder block, the squish area 4b being relatively broad around the intake recess compared with the exhaust recess.

5. A combustion chamber structure as recited in claim 3 wherein the intake and exhaust recess are of substantially semi-spherical configurations in three dimensional observation.

6. A combustion chamber structure as recited in claim 3 wherein the top surface of the piston is formed with a first recess and a second recess corresponding to the intake recess and exhaust recess respectively for defining a lower portion of the combustion chamber, the first and second recess being of circular configuration in two dimensional configuration and being arranged in a crossing relationship to each other to form a projection for producing a stream disturbance within a swirl produced in the combustion chamber.

7. A combustion chamber structure as recited in claim 6 wherein the first and second recesses are of semi-spherical configuration in three dimensional observation, the second recess being greater than the first recess in diameter.

8. A combustion chamber structure as recited in claim 3 wherein an angle of a tangential line at an edge of the recess of the cylinder head against a reference line is substantially complementary with an angle of a tangential line at an edge of the recess of the top surface of the piston against the reference line.

9. A combustion chamber structure as recited in claim 1 wherein the ignition plug is arranged substantially on a line extended along a surface of the extended wall portion facing the intake port.

10. A combustion chamber structure as recited in claim 1 wherein a further recess portion is formed around an opening for mounting the ignition plug in the exhaust recess portion.

11. A combustion chamber structure as recited in claim 1 wherein a surface of the intake recess is inclined at a first angle to a reference line in the vicinity of the intake port and a surface of the exhaust recess is inclined at a second angle to the reference line in the vicinity of the exhaust port, the second angle being greater than the first angle.

* * * * *